US010261189B2

(12) United States Patent
Cote et al.

(10) Patent No.: US 10,261,189 B2
(45) Date of Patent: *Apr. 16, 2019

(54) RECORDING SYSTEM AND APPARATUS INCLUDING GEOFENCING

(71) Applicant: INVISIBLE INTELLIGENCE, LLC, Fairfield, ME (US)

(72) Inventors: Ronald Paul Cote, West Gardiner, ME (US); John Guimond, Fairfield, ME (US)

(73) Assignee: INVISIBLE INTELLIGENCE, LLC, Fairfield, ME (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/393,666

(22) Filed: Dec. 29, 2016

(65) Prior Publication Data
US 2017/0115399 A1    Apr. 27, 2017

Related U.S. Application Data

(63) Continuation-in-part of application No. 15/179,475, filed on Jun. 10, 2016, now abandoned, which is a
(Continued)

(51) Int. Cl.
*G06F 17/00* (2006.01)
*G01S 19/03* (2010.01)
(Continued)

(52) U.S. Cl.
CPC ............ *G01S 19/03* (2013.01); *G06F 3/0482* (2013.01); *G06F 3/162* (2013.01); *G08G 5/0013* (2013.01);
(Continued)

(58) Field of Classification Search
CPC .... G06Q 10/10; G08G 5/0013; G08G 5/0021; G08G 5/0056; H04B 7/18506
See application file for complete search history.

(56) References Cited

U.S. PATENT DOCUMENTS 6,370,457 B1    4/2002    Nemeth
6,871,107 B1    3/2005    Townsend et al.
(Continued)

FOREIGN PATENT DOCUMENTS

KR    1020070023921    3/2007
WO    2008024095    2/2008

OTHER PUBLICATIONS

ARTI (Airport Real Time Information Management), Copyright 2013, AeroPath Systems, LLC, http://aeropathsystems.com/arti/, Austin, TX.
(Continued)

*Primary Examiner* — Thomas H Maung
(74) *Attorney, Agent, or Firm* — Leber IP Law; David C. Robertson

(57) ABSTRACT

A system and apparatus for recording and archiving diverse communications over radio transmissions. The system and apparatus enables unattended airports within a geofenced area to generate a useful archive of all radio communications made by Automatic Dependent Surveillance-Broadcast (ADS-B) equipped aircraft and ground personnel. A combination of hardware and software components are provided to record and store radio transmissions in computer files. Once stored, the computer files may then be replayed for training and investigation purposes. Likewise, users may generate custom reports based upon the data embodied in the computer files.

18 Claims, 7 Drawing Sheets

Related U.S. Application Data continuation of application No. 14/068,065, filed on Oct. 31, 2013, now Pat. No. 9,391,807.

(51) Int. Cl.
| | | |
|---|---|---|
| *H04L 29/08* | (2006.01) |
| *G06F 3/0482* | (2013.01) |
| *G10L 15/26* | (2006.01) |
| *G10L 19/018* | (2013.01) |
| *G06F 3/16* | (2006.01) |
| *G08G 5/00* | (2006.01) |
| *H04L 12/64* | (2006.01) |

(52) U.S. Cl.
CPC ............ *G08G 5/0026* (2013.01); *G10L 15/26* (2013.01); *G10L 19/018* (2013.01); *H04L 12/6418* (2013.01); *H04L 67/1097* (2013.01); *H04L 67/10* (2013.01)

(56) References Cited

U.S. PATENT DOCUMENTS

| | | | |
|---|---|---|---|
| 6,950,037 B1 * | 9/2005 | Clavier ................ | G08G 5/0013 340/945 |
| 7,039,509 B2 | 5/2006 | Podowski | |
| 7,072,463 B1 * | 7/2006 | Byrd ..................... | H04M 1/738 379/399.01 |
| 7,131,136 B2 | 10/2006 | Monroe | |
| 7,271,826 B2 | 9/2007 | Muirhead et al. | |
| 2003/0225492 A1 | 12/2003 | Cope et al. | |
| 2008/0261585 A1 * | 10/2008 | Souza ............... | H04M 3/42221 455/423 |

OTHER PUBLICATIONS

Behringer, "U-Control UCA222, Ultra-Low Latency 2 In/2 Out USB Audio Interface with Digital Output", Advertisement for Analog to Digital Interface, Copyright 2013 printed on Apr. 15, 2013, pp. 1-2, http://www.behringer.com/EN/Products/UCA222.aspx, www.behringer.com.

COAA Co., "Scancorder" Advertisement for Software to Digitally Record, Replay and Manage Scanner/Radio Transmissions, Printed on Apr. 15, 2013, pp. 1-2, http://www.coaa.co.uk/scancorder.htm, COAA Co., Portimao, Portugal.

Black Cat Systems, "Audiocorder", Advertisement for Software to Digitally Record, Replay and Manage Scanner/Radio Transmissions, Printed on Apr. 15, 2013, pp. 1-2, http://www.blackcatsystems.com/software/audiocorder.html, Black Cat Systems, dated Jul. 29, 2010, Westminster, MD.

Nino Porcino, "Vox Recorder for Windows" Advertisement for Software to Digitally Record, Replay and Manage Scanner/Radio Transmissions, Printed on Apr. 15, 2013, http://antoninoporcino.xoom.it/VoxRecorder/, Nino Porcino.

Ernie Mills, "Soundcard Interfacing" WM2U's Soundcard Interfacing Schemes, Printed on Apr. 15, 2013, pp. 1-6, http://www.qsi.net/wm2u/interface.html, Ernie Mills, WM2U.

Radioreference.Com LLC, "Setting Up Your Broadcasting Station" Copyright 2013, Printed on Apr. 15, 2013, pp. 1-4, http://wiki.radioreference.com/index.php/Setting_up_your_Broadcasting_Station, RadioReference.com, San Antonio, TX.

* cited by examiner

GARD Radio Day log report printed on 9/21/2013 19:03:45

Directory   C:\Users\Owner\Documents\ARL\2013\04-21-2013

| File Name | File # | Length of transmission |
|---|---|---|
| 04-58-31.wav | 1 | 3 seconds |
| 04-58-41.wav | 2 | 7 seconds |
| 04-59-06.wav | 3 | 10 seconds |
| 04-59-38.wav | 4 | 8 seconds |
| 04-59-58.wav | 5 | 8 seconds |
| 05-00-31.wav | 6 | 8 seconds |
| 05-00-47.wav | 7 | 8 seconds |
| 05-01-51.wav | 8 | 6 seconds |
| 05-02-20.wav | 9 | 3 seconds |
| 05-02-26.wav | 10 | 4 seconds |
| . | . | . |
| . | . | . |
| . | . | . |
| 19-50-09.wav | 280 | 7 seconds |
| 19-50-19.wav | 281 | 3 seconds |
| 21-42-47.wav | 282 | 7 seconds |
| 21-48-28.wav | 283 | 8 seconds |
| 22-09-40.wav | 284 | 4 seconds |
| 22-09-51.wav | 285 | 6 seconds |

Total Length of transmissions    2201 seconds

Average length of transmissions    9 seconds

Total length of all transmissions    2201 seconds   37 Minutes

RECORDING SYSTEM AND APPARATUS INCLUDING GEOFENCING

CROSS REFERENCE TO RELATED APPLICATIONS

The present application is a continuation-in-part of U.S. patent application Ser. No. 15/179,475 filed on 10 Jun. 2016 and which is a continuation of U.S. patent application Ser. No. 14/068,065 filed on 31 Oct. 2013 and which granted as U.S. Pat. No. 9,391,807 on 12 Jul. 2016, wherein the contents of each are herein incorporated by reference.

FIELD OF THE INVENTION

The present invention relates generally to recording of radio transmissions in a general aviation airport. More particularly, the present invention relates to a system and apparatus for recording and archiving diverse communications over radio transmissions and aircraft data for operational statistics of an unattended airport.

BACKGROUND OF THE INVENTION

In the area of communications involving multiple parties, there exist systems such as the digital audio transcription system disclosed by U.S. Pat. No. 6,871,107 issued to Townsend et al. Such transcription system to Townsend et al. is designed for use during court proceedings and includes at least one source of audio signals to be recorded and a computer for storing digital signals corresponding to the audio signals for allowing the stored digital signals to be subsequently played back. Recording sessions are defined by signaling the start and stopping of the digital signals accomplished via a user interface that includes a recording control mechanism. The computer associates a date and time with each file segment stored during a recording session. A playback selection allows a user to select a virtual file entry from file entries corresponding to the periods of time during which the computer has stored at least one recording session. The computer is responsive to the playback selection to identify file segments stored in memory on the desired entry date from the selected source of audio signals, which collectively represent the selected virtual file entry. This transcription system requires user intervention in terms of the recording control mechanism.

In the area of aircraft communications, there exists U.S. Pat. No. 7,271,826 issued to Muirhead et al. Such patent discloses an arrangement for audio, video and/or data communication between a ground station and an aircraft. Such arrangement has at least one communications channel and a monitoring device provided on board the aircraft. The monitoring device includes at least one audio, video or flight data recording apparatus or combinations thereof, which can be activated either from on board the aircraft or by remote control from the ground station. The recording apparatus can be deactivated by remote control from the ground station and/or from on board the aircraft when it is on the ground. The arrangement also includes a memory for the data from the recording apparatus and a transmission apparatus for transmitting data from the recording apparatus and/or data read from the memory to the ground station. The transmission apparatus uses at least one communications channel in the arrangement for audio and/or video and/or data communication between the ground station and the aircraft. This arrangement requires user intervention in terms of either the aircraft personnel or remote access by personnel on the ground.

Further, in the area of recording audio transmissions, there are several known mechanisms for recording communications in a more automatic manner than the above-referenced patents. Such mechanisms relate to a voice operated switch, also known as Voice Operated eXchange (VOX). VOX operates when sound over a certain threshold is detected and is usually used to turn on a transmitter or recorder when someone speaks and turn it off when they stop speaking. VOX is often used to save storage space on recording devices. Typical VOX circuits usually includes a delay between the sound stopping and switching directive so as to avoid having the circuit turn off during short pauses in speech.

Still further, in the area of aircraft communications, there exists well known "black box" technology which effectively records all cockpit recordings of voice and instrumentation data. Commonly, only a certain amount of data exists for any period of time which ranges from the most immediate 30 to 180 minutes. The use of VOX circuits can extend the timeframe for at least voice data. Cockpit data recorders however are generally limited to only the aircraft's data. Thus limitations in the amount and category of data are therefore limited. Such "black box" recorders are found in other fields outside of aircraft such as, but not limited to, commercial trucking, rail locomotive, and various vehicles requiring event recordation.

There is also known technology related to the next generation programs of the Federal Aviation Administration (FAA). Specifically, Automatic Dependent Surveillance-Broadcast (ADS-B) is the FAA's satellite-based successor to radar. ADS-B makes use of Global Positioning System (GPS) technology to determine and share precise aircraft location information, and streams additional flight information to the cockpits of properly equipped aircraft.

Yet still further, in the area of small airport management, there is typically no suitable mechanism for recording and archiving voice communications in a useful manner taking into account ADS-B.

It is, therefore, desirable to provide a robust, automated, VOX-type of communications system to overcome the problems associated with known systems and devices and provide improved automated communications management and which interacts with ADS-B.

SUMMARY OF THE INVENTION

It is an object of the present invention to obviate or mitigate at least one disadvantage of previous communications systems.

In a first aspect, the present invention provides a low cost audio recorder affordable for general aviation, rail, bus marinas, etc., allowing for years of data recording on a single hard drive, allowing the airport management to track the usage of the airport and also allowing for playback of audio data files which can be used as a safety training tool by both airport management and flight school instructor.

In another aspect, this provides a way of tracking activity at airports, rail yards, marinas, etc. on how busy they are and at what times, based on minutes or seconds of radio traffic providing an alternative way of processing plane counts using radio wave allowing airport management to track growth trends in annual enplanements.

In a further aspect, the present invention can assist local and federal officials providing critical voice date during accident investigations.

In still another aspect, the present invention provides a recording apparatus for monitoring multiple radio transmissions at an unattended airport located within a geofenced area, the apparatus including: a radio device for receiving multiple radio transmissions from one or more radio transmission sources; a plurality of unique signature elements each provided to a corresponding one of the one or more radio transmission sources, at least one of the unique signature elements being aircraft identity data from an ADS-B equipped aircraft located within the geofenced area; a signal interface connected to the radio device, the signal interface including an ADS-B receiver capable of receiving ADS-B data including the aircraft identity data from the ADS-B equipped aircraft and a variable attenuator capable of selective operation with a plurality of other radio devices including the radio device; and a computing device connected to the signal interface, the computing device generating data corresponding to each of the radio transmissions.

In still another aspect, the present invention provides a system for airport data recording management, the system including: one or more radio transmission sources located within a geofenced area; a radio device for receiving multiple radio transmissions from the one or more radio transmission sources; a plurality of unique signature elements each provided to a corresponding one of the one or more radio transmission sources, at least one of the unique signature elements being aircraft identity data from an ADS-B equipped aircraft located within the geofenced area; a signal interface connected to the radio device, the signal interface including an ADS-B receiver capable of receiving ADS-B data including the aircraft identity data from the ADS-B equipped aircraft and a variable attenuator capable of selective operation with a plurality of other radio devices including the radio device; a computing device connected to the signal interface, the computing device generating data corresponding to each of the multiple radio transmissions, and a cloud-based server located at a central location and storing the data along with similar data related to additional unattended airports.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

FIG. 5 shows one possible output report in accordance with the inventive system and apparatus.

DETAILED DESCRIPTION

Generally, the present invention provides a system and apparatus for enabling unattended airports (e.g., small, municipal airports with limited staff and/or control tower hours) to have a useful archive of all radio communications made by aircraft and ground personnel. It should be readily apparent that while the foregoing invention details are described in terms of airport communications, the present invention may be implemented in terms of a rail yard, a harbor including marine and ferry services, school transportation departments, municipal public works departments, taxi/bus fleets, or any similar setting with vehicular traffic and where multiple parties may be communicating via radio transmissions. In implementation within any such setting, it should be readily apparent that the present invention is useful for performance of actions such as, but not limited to, accident reconstruction, personnel training efforts, and statistical analysis.

The present invention uses a combination of hardware and software components to record and store radio transmissions in computer files. As mentioned, once stored, the computer files may then be replayed for training and investigation purposes. Likewise, the software allows a user to generate custom reports based upon the data embodied in the computer files.

Figure 1:
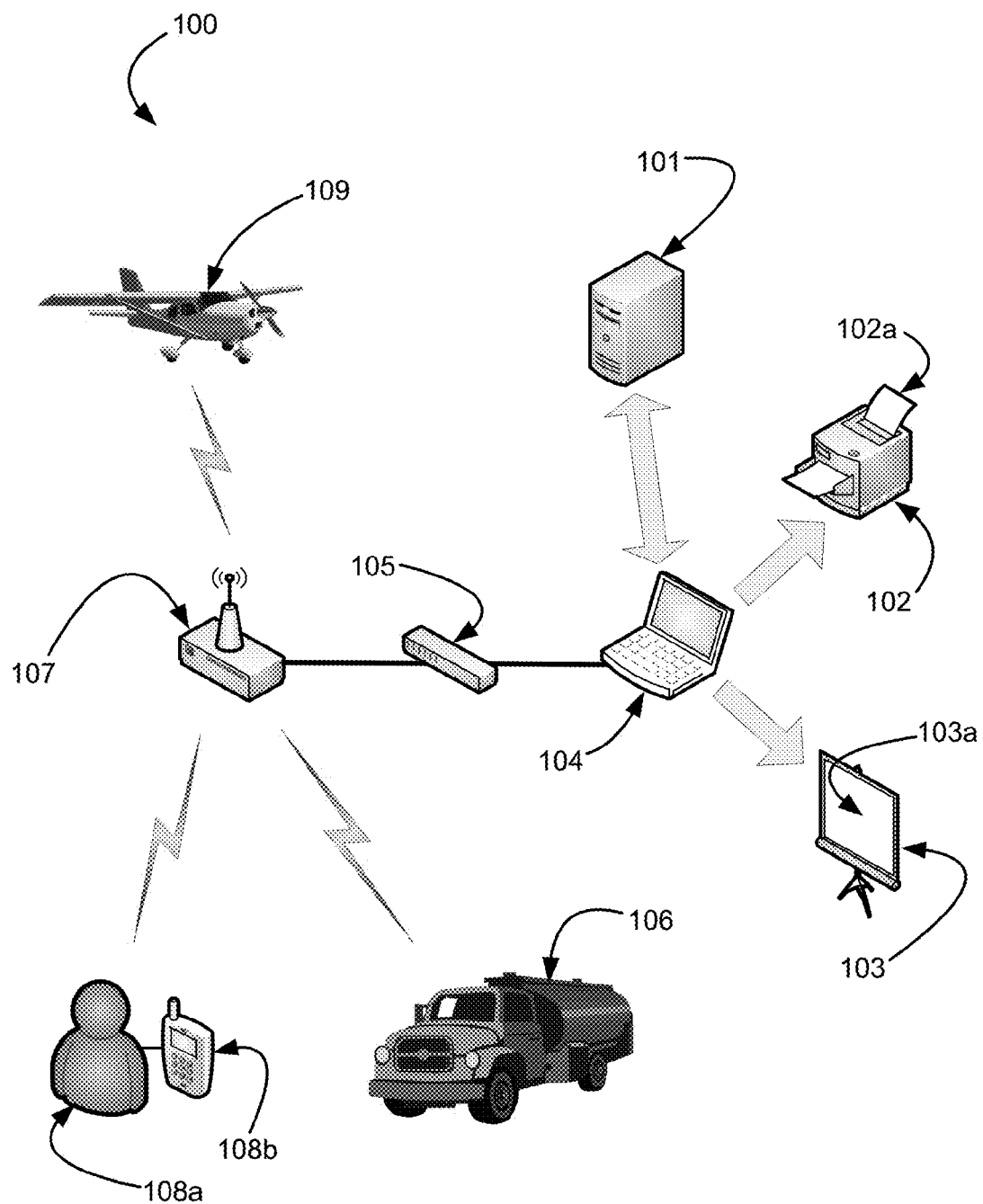
FIG. 1 shows a generalized schematic of the system and apparatus in accordance with one embodiment of the present invention.

With reference to FIG. 1, there is shown an audio recording system 100 in accordance with the present invention. The system 100 includes a radio device 107 and a computing device 104 along with a signal interface located there between in the form of a variable attenuator 105. The radio device 107 may be a radio base station or scanner of any type or manufacturer known in the general avionics field. It should be understood that variations in the specific radio device 107 will necessitate the inventive system 100 to accommodate variations in signal power which is especially important when interfacing with a standardized computer input. Hence, the variable attenuator 105 is an electronic device that reduces the power of a radio signal without appreciably distorting its waveform and transfers it for digital manipulation by the computing device 104.

The radio device 107 may include a Universal Communications (UNICOM) station typically employed at airports with a low volume of general aviation traffic and where no control tower is present or active. UNICOM stations typically use a single communications frequency which may vary among different geographic locations. For example, the Common Traffic Advisory Frequency (CTAF) is the name given to the radio frequency used for air-to-air communication at US, Canadian and Australian non-towered airports. As well, some airfields always offer UNICOM service while others revert to UNICOM procedures only during hours when the control tower is closed. Under this protocol, aircraft 109 may call a non-government ground station, radio device 107, to make announcements of their intentions. Pilots who join the frequency later can request field advisories, which may include weather information, wind direction, the recommended runway, or any previously reported traffic.

The present invention is particularly useful in regard to instances where, depending upon the time of day and/or general level of airfield activity, the ground station may not be staffed. As such, attempts to communicate will therefore receive no acknowledgement. During these times, pilots of aircraft 109 self-announce their position and/or intentions over the CTAF frequency, which is often the same as the UNICOM frequency. When a part-time UNICOM station is located on the same airport as a part-time control tower, the same frequency will be used by both ground stations to avoid confusion. Many UNICOM stations are operated by a Fixed Base Operator (FBO) and it may be possible to request services from the airport such as fuel trucks 106, ground personnel 108a with handheld radios 108b, or other services (e.g., taxi services, fire services, etc.) and entities (not shown) which may also be communicating via the airport's radio system.

The system 100 will serve to accumulate all radio communications among radio sources which may be entities on the ground (i.e., 106, 108a) and in the air (i.e., 109). The variable attenuator 105 may be provided with a standardized radio jack to interface with the radio device 107. Accordingly, the variable attenuator 105 thereby accepts a wide level of input levels from a variety of radio devices. Moreover, the present invention uses standard 3.5 mm stereo phono plugs for connections at the radio side to thereby provide access to most radio devices. The computing device 104 will process radio communications from the variable attenuator 105 and one possible configuration for the variable attenuator 105 is shown and described in further detail with regard to FIG. 4.

The computing device 104 may be any type of computer or computer-related element such as, but not limited to, a desktop computer, laptop or notebook computer, or computing tablet device. Indeed, the ever improving size reductions in computers may even allow for the use of devices such as a smart-phone to be used as the computing device 104 so long as adequate computing capability is provided by the computing device 104 in order to process the raw radio communications into useful data. To that end, the system 100 in accordance with the present invention will also include data storage 101, customizable output 102 in the form of static reports 102a, and audio/visual (A/V) output 103 in the form of graphical reports 103a with or without sound.

The data storage 101 will provide archives of all raw radio transmissions and any related information processed and thereby generated by the computing device 104. Such related information may include environmental data readings such as weather, temperature, wind, precipitation, and time of day data recorded concurrent with the radio transmissions. The data storage may be co-located with the system 100 or remotely located via networking to a cloud-based server. Likewise, a cloud-based server may be accessible to other related systems that may provide monitoring of multiple airfields from a centralized location.

It should be recognized that real-time archiving of continuous radio transmission may not be economically feasible. Furthermore, unattended airfields may generate more dead air than radio traffic. Accordingly, it should be readily understood that the use of VOX technology, or any suitable mechanism for reducing recorded dead-air, can extend the timeframe for at least voice data captured and stored by the present invention.

In operation, the present invention captures the audio feeding directly into the computing device after breaking the squelch of the radio device and digitizes the signal into a "way" format file. It is at this point the data is saved in two separate locations. Each file is saved in a day file such as "01/01/2013" and in each file a "wav" file at the exact time the file started recording (e.g., 02:14:49). Either military or conventional time may be utilized. After multiple files are recorded, the present invention can extrapolate out the times using via suitable software processing—for example, the amount of transmissions and size of these files can provide radio traffic by hour, day, week, year, etc.

The customizable output 102 may be in the form of hard copy print outs reporting useful data such as the number of radio transmissions made during a given time period. Such a report may, for example, be of value in understanding the peak periods of use of an unattended airfield. Though the use of customizable software embedded in the computing device 104, it should further be readily apparent that a variety of reports may be generated to provide information about the radio transmissions, and thus, the activity of a given airfield.

Figure 2:
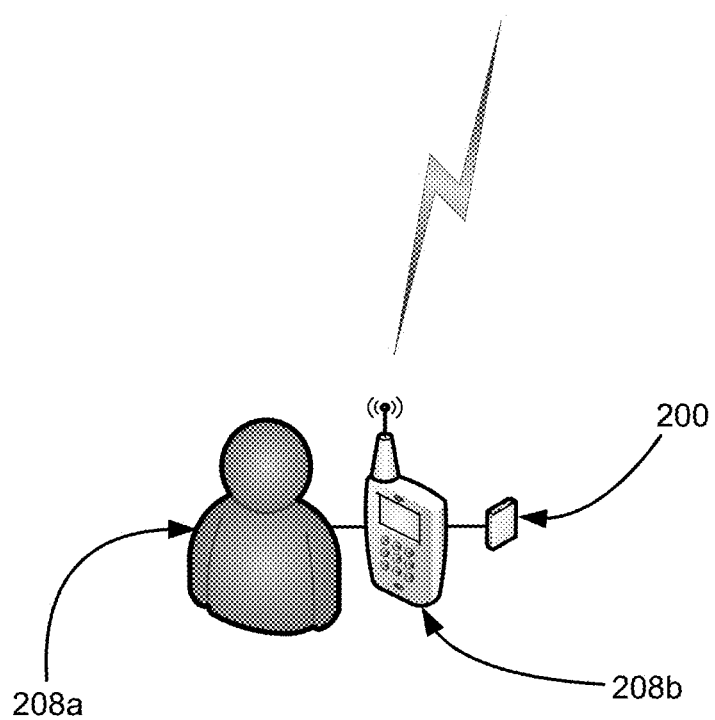
FIG. 2 illustrates a user of the present invention including a signature element providing a unique identifier to the user.

As shown in FIG. 2, the present system may also include a signature element 200 provided at a radio transmission source such a ground personnel 208a equipped with a handheld radio 208b. It should of course be understood that while personnel with a handheld radio is illustrated, any other radio device may be provided with a signature element in a similar manner. Such signature element 200 may be in the form of an electronic device that adds a dual-tone multi-frequency (DTMF) tone in the voice frequency prior to or immediately after any transmission by the given radio device. The DTMF tone would be a unique identifier and would therefore differ among differing types of radio transmission sources. In this manner, each source of a radio transmission (e.g., 106, 108a, 208a, or 109) would effectively transmit a radio signal begun (or ended) by a particular DTMF tone unique to that type of source. As such, the computing device 104 may include software that can recognize each differing DTMF tone and therefore group radio transmissions by, for example, the type of radio source. Thus, the customizable software may generate reports filtered by way of radio transmissions from aircraft, ground maintenance vehicles, emergency vehicles, or any other source of radio transmissions from a radio that includes the signature element.

It should be understood, that the present inventive system may be implemented only in the given airfield in which the system is used. In such situations, it would be readily apparent that aircraft may or may not be equipped with a signature element. However, one or more ground based sources of radio transmissions may be so equipped and thereby include a corresponding DMTF tone such that they are differentiated from aircraft transmissions not including a DTMF tone.

In a preferred embodiment, aircraft are provided with a signature element in the form of known ADS-B avionics. Under the NextGen Air Transportation System and Single European Sky (SES), properly equipped aircraft broadcast their identity, position, track, speed and other vital data via what is called ADS-B "Out" technology. The present invention incorporates the identity aspect of the ADS-B "Out" technology from aircraft that include ADS-B avionics. More specifically, the ADS-B related identity data from such aircraft form the signature element in accordance with the present invention. In this manner, each aircraft incorporating ASD-B avionics thus provides the system and apparatus of the present invention with a suitable unique identifier in the form of a signature element (i.e., the broadcast identity data). Each such signature element, and correspondingly each aircraft, is uniquely trackable by the present inventive system and apparatus. In terms of FIG. 1, the aircraft radio transmission source 109 would therefore include a signature element formed from its identity data of the ADS-B "Out" technology.

The A/V output 103a may be in the form of digital sound files with or without corresponding on-screen images and data. One useful format for the A/V output 103a may be an on-screen image including an audio clip player with concurrent visual representation of sound by an analog signal wave. Concurrent on-screen images representing other processed data and information may also be provided including a thermometer, an anemometer, or any other representation of quantifiable data that could be of interest for purposes of, for example, accident reconstruction or personnel training.

Figure 3:
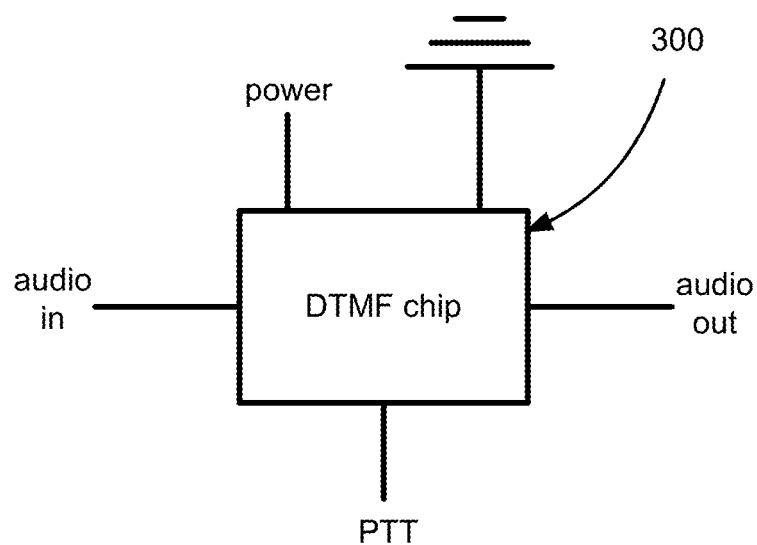
FIG. 3 shows one possible type of device as an example of the signature element of FIG. 2.

FIG. 3 shows one possible configuration of a signature element 300 that serves to embed a unique DTMF tone in each type of radio source. The signature element circuit may be implemented in the form of a typical electronic chipset manufactured to be easily attached to the intended radio source. Here, a DTMF chip is shown which may include audio in from a microphone, audio out including the embedded DTMF tone to the radio microphone or audio in, power, and push to talk (PTT) button from the radio. Moreover, the signature element 300 can be installed in the radio or microphone, needing only power, ground, audio out and the push to talk switch lines.

Figure 4:
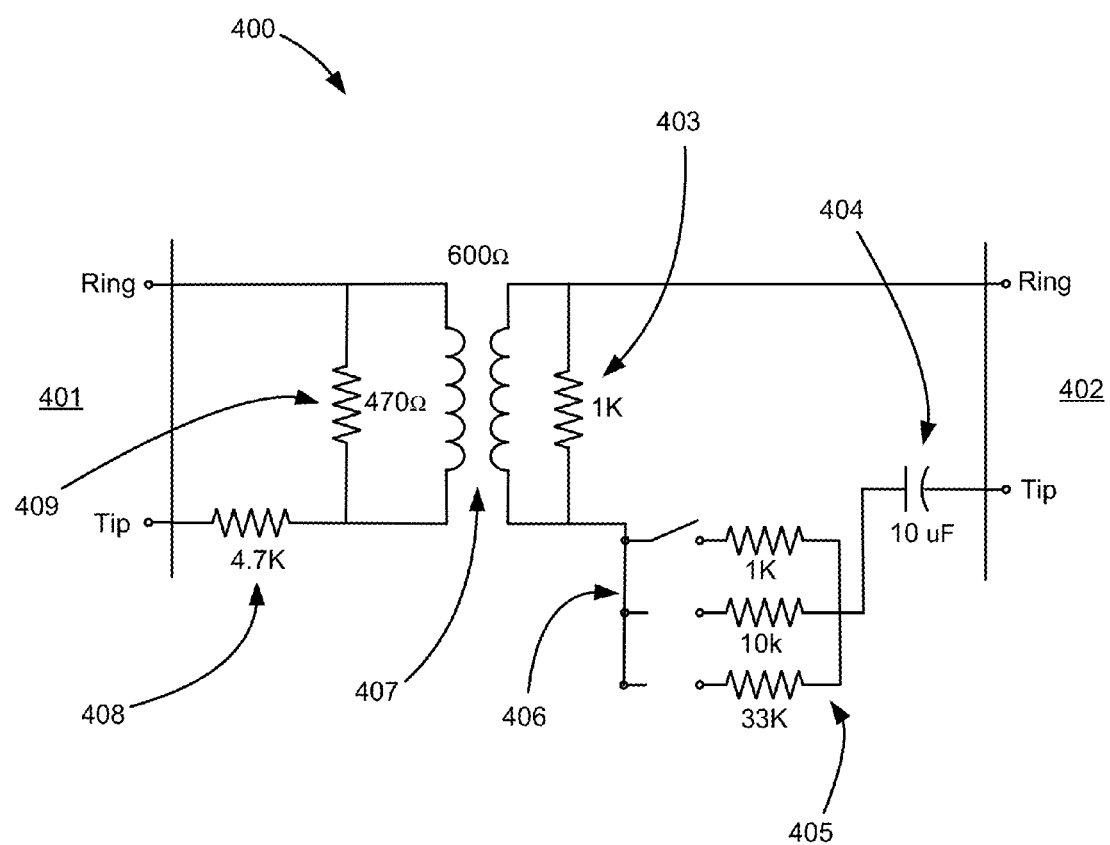
FIG. 4 shows one possible circuit configuration of a variable attenuator in accordance with the inventive system and apparatus.

FIG. 4 shows one possible circuit configuration of a variable attenuator 400 in accordance with the present invention. In general, such circuit includes an impedance matching network with a 1-to-1 isolation transformer 407 along with a 10 uF capacitor 404 allowing no DC voltage to pass such that the radio 407 and computer 402 are electrically isolated from each other. More specifically, the circuit includes a radio side coupled to a computer side via a 600 ohm audio transformer 407. Tip and ring connections are provided at the input radio 407 and output computer 402 sides of the circuit. In implementing connections, commercially available cables may be used to couple the variable attenuator to the radio device and to couple the variable attenuator to the computing device. The radio side 407 includes a resistance 408 at the tip of 4.7K ohms and a 470 ohm resistor 409 across the ring and tip in parallel with the audio transformer. Variability is provided by way a dip switch 406 used to selectively tie 1K ohm, 10K ohm, or 33K ohm resistors 405 to the computer side tip connection through a 10 uF capacitor 404. A 1K ohm resistor 403 is provided across the ring and tip in parallel with the computer side 402 of the audio transformer. While specific values for components are provided, it should be readily understood that these are only illustrative of one possible embodiment and should not be considered limiting.

FIG. 5 shows one possible output report 102a which may be provided as a hard copy report of the present inventive system. The output report 102a illustrates a typical day report showing transmission lengths and exact times, also average length of transmissions.

Figure 6:
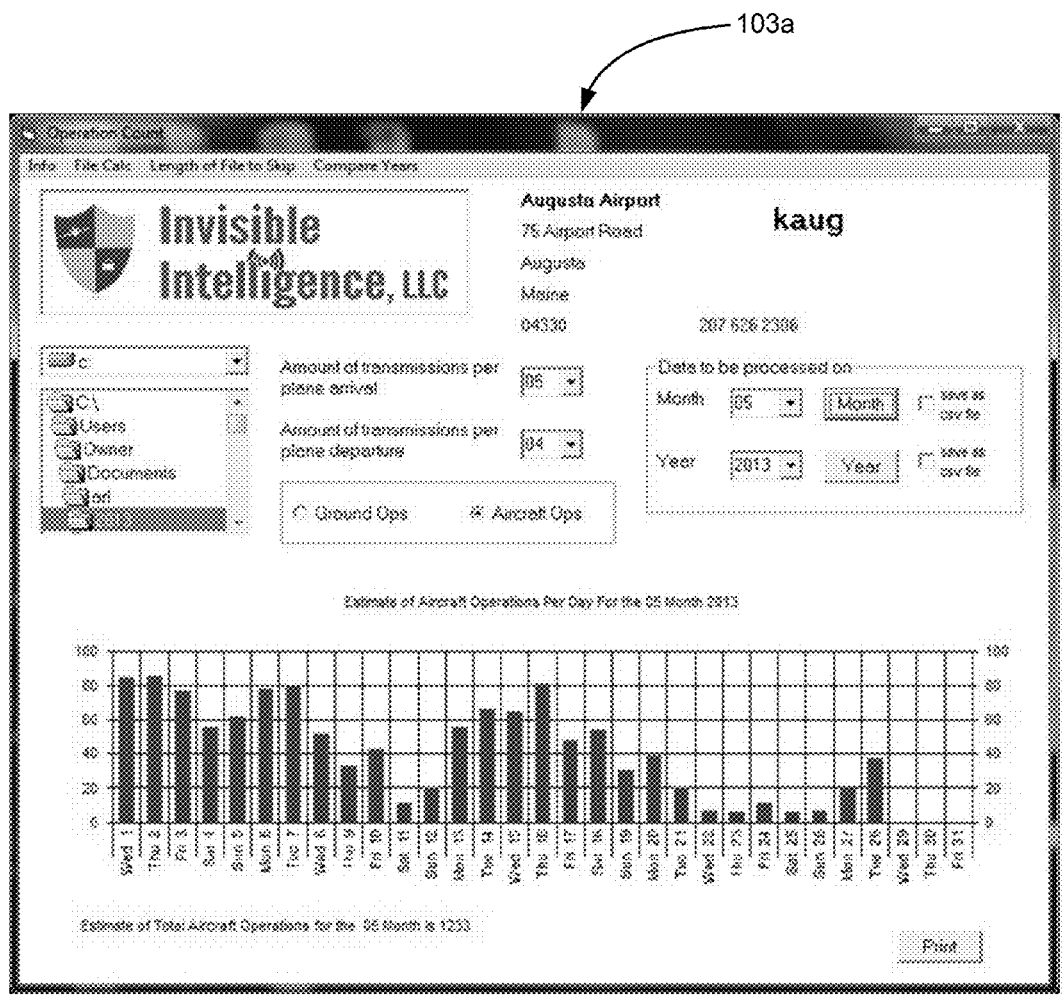
FIG. 6 shows one possible audiovisual output in accordance with the inventive system and apparatus.

FIG. 6 shows one possible on-screen a/v output 103a which may be provided as an output of the present inventive system. Here, the exemplary screen shot provides a month of data and its conversion to aircraft operation counts.

It should be clear that such information as shown in FIGS. 5 and 6 as outputs of the present inventive system and apparatus is useful to many parties including airport management in a variety of tasks including, but not limited to, determining landing and takeoff information or forensic purposes regarding incidences of accidents.

Figure 7:
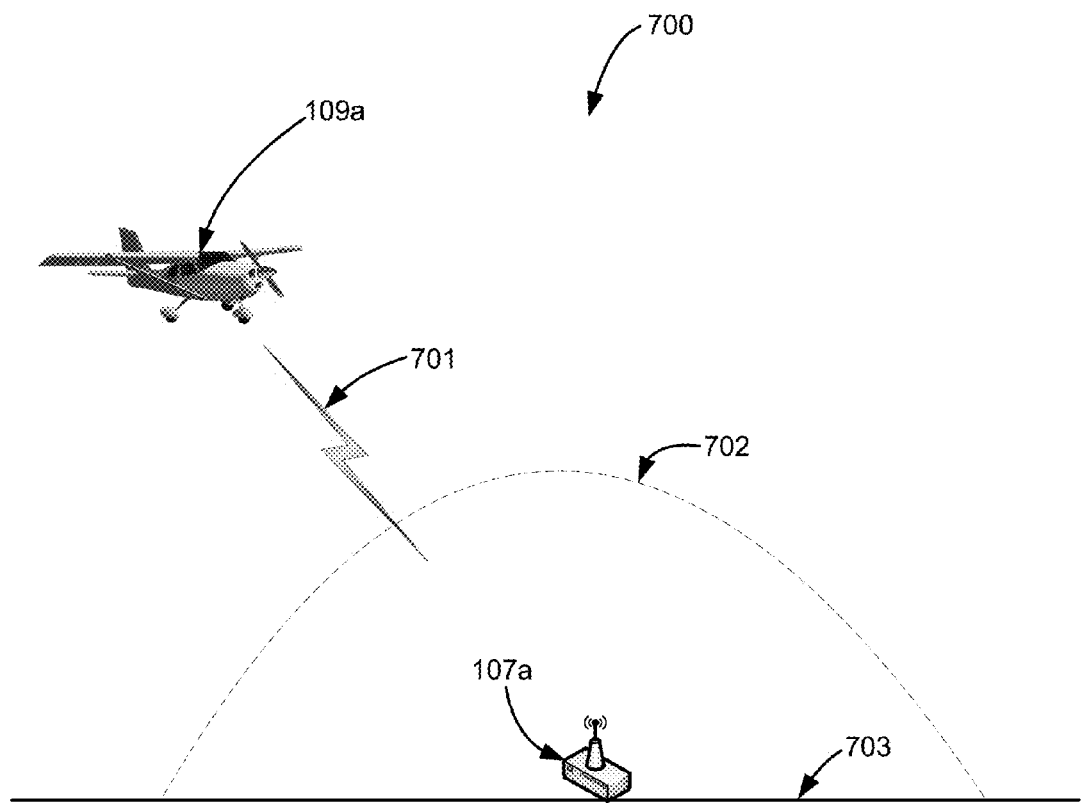
FIG. 7 shows the preferred embodiment of the present invention including an ADS-B equipped aircraft further including geofencing.

FIG. 7 shows the preferred embodiment 700 of the present invention including an ADS-B equipped aircraft 109a as previously described and further including geofencing 702. Similar to the radio device 107 shown in FIG. 1, the preferred embodiment 700 in FIG. 7 includes a radio device 107a which is modified to include an ADS-B signal receiver to receive an ADS-B "Out" signal 701 from the aircraft 109a. In terms of the present invention, the signal 701 is a unique signature element.

It should be understood that all other system elements as previously shown in FIG. 1 in addition to the radio device are of course also provided for within the preferred embodiment 700, though they are omitted from FIG. 7 for clarity of illustration. Such ADS-B signal receivers are well known in the aircraft radio art and not further described herein. In terms of the present invention, geofencing 702 denotes a virtual boundary defined in the physical environment surrounding an unattended airport where the radio device 107a is located. This may include, for example, an airspace involving a radius of one (1) mile around a center of such unattended airport up to a ceiling of one thousand (1,000) feet above the ground surface. In the instance of FIG. 7, this is seen as a dome (i.e., semi-sphere) rising from ground level 703 around an unattended airport where the radio device 107a is located. Of course, it should be understood that the specific size and shape of the airspace may vary according to user preferences and the particular requirements of any given implementation. Also, it should be readily apparent that the concept of a virtual boundary is created by way of known geofencing methodologies. As such methodologies are within the understanding of one skilled in the location based services art, they are not explained herein in any significant detail. However, in terms of the present invention, there are a couple ways to accomplish geofencing.

To accomplish geofencing with regard to the present invention, one way is to provide a mathematical formula to see how close the aircraft is to a reference point (e.g., center of airport) where this would form a large circle and anything within so many yards would be considered a valid entry. Another way is to set various GPS points on a map thereby forming a box and by using a series of < or > signs one can determine if the GPS latitude (Lat) and longitude (Lon) are in the box.

For example,
if Lat1<=Lat(aircraft) and
Lat(aircraft)>=Lat2 and
Lon1<=Lon(aircraft) and
Lon(aircraft)>=Lon2 then
entry is valid.

For purposes of illustration, one possible code implementation to identify whether an aircraft is within the geofenced area around the unattended airport may be:

Dim Lat1=44.327784
Dim Lon1=-69.803752
Dim Lat2=44.315396
Dim Lon2=-69.795113
Dim Lat3=44.317219
Dim Lon3=-69.798218
Dim Lat4=44.320722
Dim Lon4-69.789023
Dim Aircraft_Lat=44.320774
Dim Aircraft_Lon=-69.78933
Dim y
If Aircraft_Lat<Lat1 And Aircraft_Lat>Lat2 And Math.Abs(Aircraft_Lon)<Math.Abs(lon3) And Math.Abs(Aircraft_Lon)>Math.Abs(lon4) Then
y=1
TextBox3.Text="aircraft in gps cords"
Elself y=0 Then
TextBox3.Text="plane not in gps cords"
'Stop
End If As mentioned, an aircraft equipped with ADS-B "Out" avionics will broadcast their identity, position, track, speed and other vital data. Once such an aircraft is identified within the given geofenced area of an unattended airport, this broadcast data is used to track aircraft movement including, but not limited to, where such aircraft is parked, whether it taxied and took off or just landed, which runway it used, what direction it traveled, and the like. While aircraft audio transmissions and aircraft ADS-B transmissions are of course distinct from one another, either or both may be used to track operations at an unattended airport by way of the present invention. In particular, this tracked aircraft movement within the geofenced along with aircraft identity may then be paired with audio and date/time stamping to form output data which provides improved operational count capabilities—e.g., runway usage data may therefore be automated through the use of ADS-B "Out" broadcast data in conjunction with the present invention. Moreover, the present invention provides the ability to perform counting and tracking of aircraft at general aviation airports (i.e., unattended airports) via ADS-B. As previously suggested, it should be readily apparent that this capability would be enabled by providing the circuitry of FIG. 4 with an additional ADS-B receiver chipset by any known manner in the electronics art.

Having thus described geofencing at an unattended airport and corresponding tracking of an aircraft equipped with ADS-B "Out" avionics, it should also be noted that multiple aircraft equipped with ADS-B "Out" avionics may be encountered at more than one geofenced unattended airport. As previously mentioned, data storage in accordance with the present system may be co-located with the system or remotely located via networking to a cloud-based server. Likewise, a cloud-based server may be accessible to other related systems that may provide monitoring of multiple airfields from a centralized location. In this manner, flights between and among multiple unattended airports may be tracked across a larger geographic area. For example, a first unattended airport may store aircraft movement data while an ADS-B equipped aircraft is located within the corresponding first geofenced area, and later that same ADS-B equipped aircraft will be tracked at a second unattended airport. Because such data from the first and second unattended airports are stored in a centralized location, this data may be processed to provide aircraft tracking information among multiple unattended airports. The more airports and aircraft that are included in the network will result in a greater overall amount of tracking data that may be used for useful purposes such as, but not limited to, three-dimensional representations and air traffic modeling.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for airport data recording management, said system comprising:
    a geofenced area denoted by a virtual boundary defined in a physical environment surrounding an unattended airport;
    one or more radio transmission sources located within said geofenced area;
    a radio device for receiving multiple radio transmissions from said one or more radio transmission sources;
    a plurality of unique signature elements each provided to a corresponding one of said one or more radio transmission sources, at least one of said unique signature elements being aircraft identity data from an Automatic Dependent Surveillance-Broadcast Out (ADS-B Out) equipped aircraft located within said geofenced area, at least one of said unique signature elements is a different DTMF tone unique to each said one or more radio transmission sources;
    a signal interface connected to said radio device, said signal interface including an ADS-B receiver capable of receiving identity broadcast data including said aircraft identity data from said ADS-B Out equipped aircraft and a variable attenuator capable of selective operation with a plurality of other radio devices including said radio device;
    a computing device connected to said signal interface, said computing device generating data corresponding to each of said multiple radio transmissions,
    a cloud-based server located at a central location and storing said data along with similar data related to additional unattended airports, and
    an output report generated by said computing device based upon all accumulated data stored at said cloud-based server, said output report including operational counts within said geofenced area of said unattended airport.

2. The system as claimed in claim 1 wherein said cloud-based server provides data storage that is located remote from said computing device.

3. The system as claimed in claim 2 further including an audiovisual output generated by said computing device, said audiovisual output including a digital audio clip of said radio transmission selectable by a range of corresponding time stamps.

4. The system as claimed in claim 2 wherein said output report includes information categorized by one or more of said unique signature elements.

5. The system as claimed in claim 3 wherein said audiovisual output and said output report provide airport management information so as to track usage of an airport utilizing said system.

6. The system as claimed in claim 3 wherein said audiovisual output and said output report provide safety training information so as to instruct personnel of an airport utilizing said system.

7. The system as claimed in claim 3 wherein said audiovisual output and said output report provide airport activity information so as to track takeoff and landing occurrences at an airport utilizing said system.

8. The system as claimed in claim 3 wherein said audiovisual output and said output report provide voice data information so as to track accident occurrences at an airport utilizing said system.

9. The system as claimed in claim 2 wherein said output report includes information categorized by one or more of said unique signature elements of more than one unattended airport.

10. The system as claimed in claim 2 said output report includes counting and tracking information of said ADS-B Out equipped aircraft within said geofenced area of more than one unattended airport.

11. The system as claimed in claim 1 wherein said geofenced area includes airspace defined by a predetermined radius around a center of said unattended airport.

12. The system as claimed in claim 11 wherein said airspace is further defined by a predetermined ceiling above ground of said unattended airport.

13. A system for airport data recording management, said system comprising:
   a geofenced area denoted by a virtual boundary defined in a physical environment surrounding an unattended airport, said virtual boundary including a horizontally and vertically predetermined airspace;
   one or more radio transmission sources located within said geofenced area;
   a radio device for receiving multiple radio transmissions from said one or more radio transmission sources;
   a plurality of unique signature elements each provided to a corresponding one of said one or more radio transmission sources, at least one of said unique signature elements being aircraft identity data from an Automatic Dependent Surveillance-Broadcast Out (ADS-B Out) equipped aircraft located within said geofenced area, at least one of said unique signature elements is a different DTMF tone unique to each said one or more radio transmission sources;
   a signal interface connected to said radio device, said signal interface including an ADS-B receiver capable of receiving identity broadcast data including said aircraft identity data from said ADS-B Out equipped aircraft and a variable attenuator capable of selective operation with a plurality of other radio devices including said radio device;
   a computing device connected to said signal interface, said computing device generating data corresponding to each of said multiple radio transmissions,
   a server storing said data along with similar data related to additional unattended airports, and
   said computing device generates an output report from all accumulated data stored at said server and said output report includes all operational counts within said geofenced area of said unattended airport.

14. The system as claimed in claim 13 wherein said output report includes counting and tracking information of said ADS-B Out equipped aircraft within said geofenced area of more than one unattended airport.

15. The system as claimed in claim 14 further including an audiovisual output generated by said computing device, said audiovisual output including a digital audio clip of said radio transmission selectable by a range of corresponding time stamps.

16. The system as claimed in claim 15 wherein said horizontally and vertically predetermined airspace is defined by both a predetermined radius around a center of said unattended airport and a predetermined ceiling above ground of said unattended airport.

17. The system as claimed in claim 16 wherein said server provides data storage that is located locally with said computing device.

18. The system as claimed in claim 16 wherein said server provides data storage that is located remote from said computing device.

* * * * *